United States Patent [19]

Kurrat

[11] 4,084,667
[45] Apr. 18, 1978

[54] VIBRATION DAMPER FOR VEHICLE SPRING SYSTEMS

[75] Inventor: Klaus Kurrat, Sindelfingen, Germany

[73] Assignee: Daimler-Benz Aktiengesellschaft, Germany

[21] Appl. No.: 744,453

[22] Filed: Nov. 23, 1976

Related U.S. Application Data

[63] Continuation of Ser. No. 473,170, May 24, 1974, abandoned.

[30] Foreign Application Priority Data

May 26, 1973  Germany ............................ 2326983

[51] Int. Cl.² .............................................. F16F 9/34
[52] U.S. Cl. .................................. 188/275; 188/280; 188/285; 188/322; 267/65 R; 280/714
[58] Field of Search ............... 188/275, 279, 280, 282, 188/285, 299, 316, 317, 319, 320, 322; 267/64 R, 65 R, 65 D, DIG. 1; 280/714

[56] References Cited

U.S. PATENT DOCUMENTS

| | | | |
|---|---|---|---|
| 3,039,566 | 6/1962 | Rumsey | 188/299 |
| 3,086,622 | 4/1963 | Schultze | 188/317 |
| 3,184,011 | 5/1965 | Pollock | 188/279 |
| 3,256,960 | 6/1966 | Casimir | 188/299 |
| 3,421,606 | 1/1969 | Cadiou | 188/320 |
| 3,572,363 | 3/1971 | Roach | 188/280 |

FOREIGN PATENT DOCUMENTS

| | | | |
|---|---|---|---|
| 1,048,137 | 12/1953 | France | 188/275 |
| 1,264,165 | 3/1968 | Germany | 188/282 |
| 677,176 | 8/1952 | United Kingdom | 188/317 |
| 794,354 | 4/1958 | United Kingdom | 188/275 |
| 208,449 | 12/1967 | U.S.S.R. | 188/299 |

Primary Examiner—Trygve M. Blix
Assistant Examiner—Edward R. Kazenske
Attorney, Agent, or Firm—Craig & Antonelli

[57] ABSTRACT

A vibration damper with a hydraulic damping mechanism for vehicle spring systems, in which damping valves operating by throttling the pressure medium displaced out of one working space into the other working space are interconnected between two working spaces of the hydraulic pressure medium; the two working spaces are short circuited by a by-pass connection by-passing the damping valves whereby a by-pass valve is also interconnected into the by-pass connection which operates as a function of oscillation velocity and whose valve adjusting member adjusts the by-pass connection to a narrower cross section with rising oscillation velocities.

12 Claims, 1 Drawing Figure

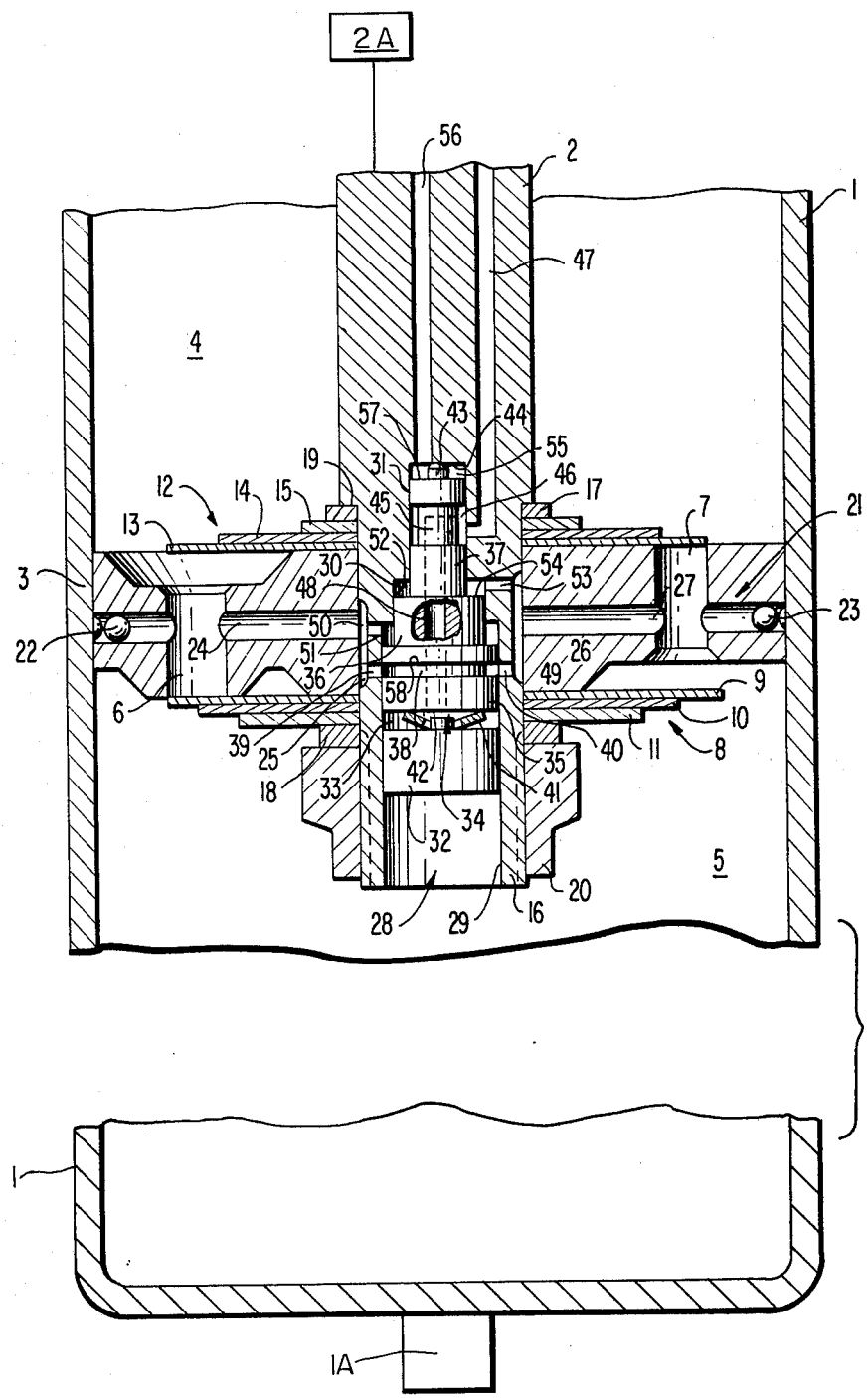

VIBRATION DAMPER FOR VEHICLE SPRING SYSTEMS

This is a continuation of application Ser. No. 473,170 filed May 24, 1974 now abandoned.

The present invention relates to a vibration damper with a hydraulic damping mechanism for vehicle spring systems, in which damping valves operating by means of a throttling action of the pressure medium displaced out of one working space into the other working space are interconnected between the two working spaces of the hydraulic pressure medium.

With these vibration dampers or shock absorbers generally customary in the automotive industry, difficulties are encountered to match the damping characteristics of the damping valves within the range of vibration or oscillation velocities approaching zero with the high friction forces of the wheel suspension occurring within this range, which superimpose themselves on the damping resistance in the same direction. For reasons of the driving safety, it is necessary that already at small vibration or oscillation velocities, a relatively high damping resistance is effective in order to avoid a jumping of the wheels. However, if one provides for this purpose a hard damping characteristic for the damping valves at small vibration or oscillation (shock) velocities, then there exists the danger that the driving comfort is impaired by the addition of friction and damping resistance. A hard damping characteristic at small vibration or oscillation velocities additionally has as a consequence a low response sensitivity of the damping valves. If, in contrast thereto, the damping valves have a low damping resistance value at a vibration or oscillation velocity approximately equal to zero in consideration of the friction forces and the response sensitivity, then it is difficult by reason of the known exponential function of the damping resistance to impart to the damping characteristics at small oscillation or vibration velocities the linear or progressive curve with relatively high damping resistance values, necessary for achieving a high damping output.

The present invention is concerned with the task, considering the points of view described above, to facilitate in a vibration damper or shock absorber of the aforementioned type, the matching of the damping characteristics at small vibration or oscillation velocities to the friction forces of the wheel suspension.

The underlying problems can be solved according to the general inventive concept, on which the present invention is predicated, in three different ways. The present invention thereby starts with the basic concept to permit the damping valves to operate only at relatively higher vibration or oscillation velocities and to interconnect between the working spaces a by-pass valve operable at relatively lower vibration or oscillation velocities, which controls in dependence on one or several influencing magnitudes or perameters a by-pass throttling cross-section separate from the overflow channels of the damping valves, which throttling cross-section supplies the damping resistance within the range of the relatively lower vibration or oscillation velocities starting from zero. The function of the by-pass valve is then such that at the vibration or oscillation velocity of zero, it adjusts an opening cross-section between the working spaces which is matched to the friction moments of the wheel suspension. If one starts with the basic assumption that already a constant opening cross-section of the by-pass valve has as a consequence with rising vibration or oscillation velocities a considerably steeper curve of the damping resistance than customary vibration dampers or shock absorbers with throttle cross-sections that are enlarged with rising oscillation or vibration velocities, then it becomes clear that for the case of high friction forces in the wheel suspension a further opening cross-section can be adjusted by the by-pass valve at the oscillation or vibration velocity zero without the danger that with oscillation or vibration velocities rising from zero and therewith in the case of friction forces that become smaller, the damping characteristic inherent in the by-pass valve produces excessively low damping resistance values within this velocity range. As a result of the steep curve of the damping resistance of the by-pass valve, it is also assured that the damping valves respond easily and readily, notwithstanding the high starting damping resistance thereof favorable for heavy vehicles, because the pressure existing at these valves rises steeply to the same extent as the damping resistance of the by-pass valve.

According to the first proposal according to the present invention, the arrangement may thereby be made in such a manner that the two working spaces are short-circuited by a by-pass connection by-passing the damping valves, and a by-pass valve operating in dependence on the vibration or oscillation velocity is interconnected into the by-pass connection, whose valve adjusting member establishes a narrower overflow cross-section of the by-pass connection with increasing oscillation or vibration velocities. With a vibration damper or shock absorber constructed in this manner, the curve of the damping resistance produced by the by-pass valve is steeper than if this valve establishes a constant opening cross-section. The higher damping resistance values which are thereby possible already at smaller vibration or oscillation velocities, are of advantage in particular with commercial vehicles, such as trucks which have a high overall weight.

According to the second proposal according to the present invention, provision may also be made as solution to the aforementioned underlying task that a by-pass valve operating in dependence on the static vehicle load is interconnected into a by-pass connection short-circuiting the working spaces and the valve adjusting member of the by-pass valve adjusts a narrower overflow cross-section of the by-pass connection with an increasing vehicle load. With such a vibration damper or shock absorber, the by-pass valve may adjust, for example, a different constant opening cross-section for each vehicle load so that the damping valves with an increase of the vehicle load respond already at a lower vibration or oscillation velocity and their damping resistance curves are displaced in the direction of a smaller vibration or oscillation velocity.

The third proposal according to the present invention resides in the combination of the two first proposals, which means, in a vibration damper or shock absorber according to the third proposal, the by-pass valve operates in dependence on the vibration or oscillation velocity and on the static vehicle load.

Vibration dampers or shock absorbers according to the three aforementioned proposals of the present invention may include, for example, an adjusting piston cooperating with the by-pass valve which is provided for the influence magnitude "oscillation or vibration velocity" with a piston pressure surface adapted to be acted upon by the pressure of the working space that is respectively under compression, and for the influencing magnitude "vehicle load" with a piston pressure surface adapted to be acted upon by a pressure dependent on the load.

Accordingly, it is an object of the present invention to provide a vibration damper with hydraulic shock absorption for vehicle spring systems which avoids by simple means the aforementioned shortcomings and drawbacks encountered in the prior art.

Another object of the present invention resides in a vibration damper for vehicle wheel-suspensions which facilitates a matching of the damping characteristics of the damping valves with the friction forces of the wheel suspension, particularly within the range of low vibration or oscillation velocities.

A further object of the present invention resides in a vibration damper of the type described above which assures completely satisfactory damping characteristics without impairing the driving comfort and/or driving safety.

Still another object of the present invention resides in a shock absorber which assures high starting damping resistance values together with good response characteristics of the damping valves.

These and other objects features and advantages of the present invention will become more apparent from the following description when taken in connection with the accompanying drawings which shows, for purposes of illustration only, one embodiment in accordance with the present invention, and wherein:

The single FIGURE is a schematic axial cross-sectional view, on an enlarged scale, of a single-tube vibration damper in accordance with the present invention in which the by-pass valve operates as a function of both vibration velocity and static vehicle load.

Referring now to the single FIGURE of the drawing, reference numeral 1 designates a shock absorber or damper cylinder which may be operatively connected with one of the two parts of the vehicle spring system that are movable relative to one another, for example, with the wheel by way of schematically depicted connecting means 1A. A damper piston 3 secured at a piston rod 2 is displaceably guided within the damper cylinder 1. The piston rod 2 is thereby operatively connected with the other swinging part of the vehicle spring system, for example, with the spring supported vehicle superstructure by way of schematically depicted connecting means 2A.

The damper piston 3 subdivides the interior space of the damper cylinder 1 into the two working spaces 4 and 5. During the outward spring deflection of the wheel with respect to the vehicle superstructure, pressure medium is displaced out of the working space 4 into the working space 5 by way of a number of overflow channels 6 uniformly distributed over the annular cross-section of the damper piston 3. During the inward spring deflection the pressure medium displaced out of the working space 5 flows into the working space 4 by way of a further number of overflow channels 7 uniformly distributed over the annular piston cross-section.

The overflow channels 6 are closed off on the piston end face adjacent the working space 5 by a damping valve generally designated by reference numeral 8 which consists essentially of a packet of valve spring disks 9 to 11 which are stepped in diameter and in thickness. In a corresponding manner the overflow channels 7 are closed off on the other piston end face by a damping valve generally designated by reference numeral 12 and consisting of a packet of three valve spring disks 13 to 15 of suitably stepped construction as shown. The damper piston 3 and its two damping valves 8 and 12 are mounted over a reduced end pin 16 of the piston rod 2 and are clamped fast between a radial shoulder 19 of the piston rod 2 and a threaded nut 20 screwed over the end pin 16 by way of one clamping ring 17 and 18 each.

For purposes of creating a by-pass connection between the working spaces 4 and 5 which by-passes the damping valves 8 and 12, the damping piston 3 is provided with a radial overflow bore generally designated by reference numeral 21 which is closed off pressure-tight at its outer ends by one steel ball 22 and 23 each and intersects both an overflow channel 6 and an overflow channel 7. The section 24 of the overflow bore 21 which intersects the overflow channel 6 terminates at its radially inner end in an axial groove 25 at the circumference of the end pin 16, with respect to which a further axial groove 26 of the end pin 16 is disposed diametrically opposite. The section 27 of the overflow bore 21 which intersects the overflow channel 7 terminates in the axial groove 26. The end pin 16 is provided with a central cylinder bore generally designated by reference numeral 28 which includes three sections 29, 30 and 31 that are stepped in diameter. A cylindrical closure member 32 is inserted pressure-tight as well as fixed against movement into the wide section 29 terminating in the working space 5; the closure member 32 closes off a valve chamber 33 of the section 29 with respect to the working space 5.

The cylinder bore 28 accommodates a correspondingly stepped by-pass piston slide valve member generally designated by reference numeral 34 having a wide piston section 35 seated in the wide bore section 29, a middle piston section 36 seated in the middle bore section 30 and a narrow piston section 37 seated in the narrow bore section 31. The wide piston section 35 is provided with a circumferential groove 38 which establishes a connection between two radial apertures 39 and 40 provided in the end pin 16, of which the aperture 39 terminates in the axial groove 25 and the aperture 40, in the axial groove 26. The by-pass piston slide valve member 34 is retained in the illustrated normal rest position by a cup spring 41 arranged in the valve chamber 33, which is supported between the piston pressure surface 42 of the by-pass piston slide valve member 34 adjacent the valve chamber 33 and the closure member 32. In this position an end face abutment pin 43 of the narrow piston section 37 abuts at the radial closure wall 44 of the narrow bore section 31. In the normal rest position of the by-pass piston slide valve member 34, the apertures 39 and 40 are connected with each other by way of the circumferential groove 38 whereby the aperture 39 is connected with the working space 4 by way of overflow channel 6, the bore section 24 and the axial groove 25 and the aperture 40 is connected with the working space 5 by way of the overflow channel 7, the bore section 27 and the axial groove 26.

An annular chamber 46 is formed in the narrow bore section 31 by a circumferential groove 45 in the narrow piston section 37, which in all positions of the by-pass piston slide valve member 34 is in constant communication with an axial channel 47 of the piston rod 2, within which prevails atmospheric pressure. An axial slide valve channel 48 provided in the by-pass piston slide valve member 34 terminates in the circumferential groove 45 which establishes a connection between the chambers 46 and 33 so that the piston pressure surface 42 is acted upon by atmospheric pressure.

On the side of the wide piston section 35 opposite the valve chamber 33 is disposed a ring-shaped valve chamber 49 which is connected with the axial groove 25 by way of a radial aperture 50 of the end pin 16 so that the ring-shaped piston pressure surface 51 of the wide piston section 35 which delimits the valve chamber 49 is acted upon by the pressure of the working space 4.

The middle piston section 36 also encloses a ring-shaped valve chamber 52 which is in communication with the axial groove 26 by way of a radial aperture 53 of the end pin 16 so that the ring-shaped piston pressure surface 54 of the middle piston section 36, which delimits the valve chamber 52, is acted upon by the pressure of the working space 5.

Finally, a valve chamber 55 is provided within the narrow bore section 31 between the closure wall 44 and the narrow piston section 37, in which terminates a channel 56 of the piston rod 2 which is under a load-dependent pressure so that the piston pressure surface 57 of the narrow piston section 37 which delimits the valve chamber 55, is acted upon by a pressure that is dependent on the vehicle load.

The damping valves 8 and 12 are so adjusted that they keep the overflow channels 6 and 7 closed at smaller oscillation or vibration velocities.

For purposes of explaining the operation of the by-pass valve 35, 38 exclusively as a function of velocity in the construction of the damper according to the first inventive proposal, one considers the channel 56 of the piston rod 2 closed off with respect to the valve chamber 55. During relatively slow inward spring deflections of the wheel, i.e., at small oscillation or vibration velocities of the damper piston 3 with respect to the damper cylinder 1, pressure medium under a pressure rise in the working space 5 is displaced into the working space 4 through the by-pass connection by way of aperture 40, the circumferential groove 38 and the aperture 39 and is throttled thereby so that a damping resistance is opposed to the inward spring deflection. The pressure rise in the working space 5 becomes effective at the piston pressure surface 54 so that the by-pass slide valve member 34 reduces the overflow cross-section of the apertures 39 and 40 by means of its control edge 58 at the circumferential groove 38 to the extent as the pressure in the working space 5 increases the stress of the cup spring 41. This pressure is dependent on the vibration or oscillation velocity of the damper piston 3. As a result thereof, the damping resistance at the aperture 40 increases and therewith the pressure increases progressively in the working space 5, until the response value which opens the damping valve 12, is reached and the further curve and therewith development of the damping resistance is determined as a function of the oscillation or vibration velocity essentially by the damping valve 12.

During the outward spring deflection of the wheel, the piston pressure surface 51 effects in a corresponding manner a reduction of the overflow cross-section of the apertures 39 and 40 until the damping valve 8 responds.

For purposes of explaining the function of the by-pass valve 35, 38 exclusively as a function of load in the construction of the damper according to the second inventive proposal, one considers the apertures 50 and 53 closed off with respect to the associated valve chambers 49 and 52. The piston pressure surface 57 then adjusts a smaller overflow cross section for the apertures 39 and 40 and at a higher vehicle load than at a lower vehicle load. The overflow cross-section adjusted for a predetermined vehicle load, remains constant at all oscillation or vibration velocities. In this manner the response value in the working spaces 4 and 5 opening the damping valves 8 and 12 is reached at higher vehicle loads already at a smaller vibration or shock velocity than at lower vehicle loads.

Corresponding to the third inventive proposal, the last mentioned functioning also applies to the illustrated shock absorber or vibration damper, however, the curve of the damping resistance reduced by the by-pass valve extends steeper by reason of the constriction of the throttling cross-section of the apertures 39 and 40 by means of the piston pressure surface 51 and 54 which takes place in dependence on the oscillation or shock velocity.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. A vibration damper comprising:

cylinder means, piston means movably disposed in said cylinder means with a first fluid working space at one side of said piston means and a second fluid working space at the other side of said piston means, first damping valve means for permitting passage of fluid medium from said first space to said second space in response to a predetermined increase of pressure in said first space upon movement of said piston means in a direction toward said first space, second damping valve means for permitting passage of fluid medium from said second space to said first space in response to a predetermined increase of pressure in said first space upon movement of said piston means in a direction toward said second space, bypass connection means for accommodating passage of fluid medium between said first and second spaces in bypassing relationship to said first and second damping valve means, and bypass valve means for continuously and automatically controlling the flow cross-section of said bypass connection means in dependence on at least one influencing magnitude during both directions of flow of said fluid medium between said first and second space, such that during an increase in said influencing magnitude the flow cross-section of said bypass connection means is reduced and the temporal quantity of said fluid medium directly passing through said first and second damping valve means without throttling is simultaneously increased, each of said first and second damping valve means and said bypass valve means operating independently relative to one another, wherein one of said cylinder means and piston means includes means for attaching itself to a vehicle superstructure and the other of said cylinder means and piston means includes means for attaching itself to a vehicle wheel, and wherein said bypass valve means includes a movable adjusting stepped piston having three stepped piston sections of different diameters, said stepped piston being slidably mounted in an axial bore of said piston means, and wherein a closure member closes one end of said axial bore.

2. A vibration damper according to claim 1, wherein a spring means is interposed between the closure member and the stepped piston to spring load the stepped piston with respect to the closure member, said closure member being fixedly held in the piston means.

3. A vibration damper according to claim 2, wherein the piston means includes a piston member slidable along said cylinder means and a piston rod supporting the piston member, and wherein aperture means are provided in the piston rod, said piston member being provided with overflow channel means valved by the damping valve means.

4. A vibration damper according to claim 3, wherein the overflow channel means extend essentially in the axial direction and wherein bore means are provided which intersect the overflow channel means and are in communication with the aperture means.

5. A vibration damper according to claim 4, wherein the bore means extend substantially at right angle to the overflow channel means and generally in a radial direction of the piston member.

6. A vibration damper according to claim 5, wherein said stepped piston includes control surfaces to directly control the opening of said aperture means in dependence on the axial position of said stepped piston in said piston rod.

7. A vibration damper comprising:
cylinder means,
piston means movably disposed in said cylinder means with a first fluid working space at one side of said piston means and a second fluid working space at the other side of said piston means,
first damping valve means for permitting passage of fluid medium from said first space to said second space in response to a predetermined increase of pressure in said first space upon movement of said piston means in a direction toward said first space,
second damping valve means for permitting passage of fluid medium from said second space to said first space in response to a predetermined increase of pressure in said first space upon movement of said piston means in a direction toward said second space,
bypass connection means for accommodating passage of fluid medium between said first and second spaces in bypassing relationship to said first and second damping valve means,
and bypass valve means for continuously and automatically controlling the flow cross-section of said bypass connection means in dependence on at least one influencing magnitude during both directions of flow of said fluid medium between said first and second space, such that during an increase in said influencing magnitude the flow cross-section of said bypass connection means is reduced and the temporal quantity of said fluid medium directly passing through said first and second damping valve means without throttling is simultaneously increased, each of said first and second damping valve means and said bypass valve means operating independently relative to one another,
wherein one of said cylinder means and piston means includes means for attaching itself to a vehicle superstructure and the other of said cylinder means and piston means includes means for attaching itself to a vehicle wheel,
wherein said bypass valve means includes a movable adjusting piston means which controls the cross-section of said bypass connection means, said adjusting piston means including first pressure surface means continuously acted upon by the pressure of the fluid medium in one of said spaces such that said adjusting piston means is continuously forced in a first direction by said pressure in said one of said spaces,
wherein said adjusting piston means includes second pressure surface means continuously acted upon by the pressure of the fluid medium in the other of said spaces such that said adjusting piston means is continuously forced in said first direction by said pressure in said other of said spaces,
wherein a static vehicle load acts on said vibration damper, and wherein said adjusting piston means is provided with a piston pressure surface adapted to be acted upon by a pressure dependent on the static vehicle load and with a further piston pressure surface adapted to be acted upon by a lower pressure and operable in the opposite direction, and
wherein said adjusting piston means is a stepped piston having three stepped piston sections of different diameters adapted to valve aperture means forming part of said bypass connection means, and characterized in that a closure member closes one end of a space in a piston rod of said piston means which accommodates said stepped piston.

8. A vibration damper according to claim 7, wherein a spring means is interposed between the closure member and the stepped piston to spring load the latter with respect to the former which is fixedly held in the piston assembly.

9. A vibration damper according to claim 8, wherein said aperture means are provided in said piston rod supporting thereon a piston member of said piston means, said piston member being provided with overflow channel means valved by said damping valve means.

10. A vibration damper according to claim 9, wherein the overflow channel means extend essentially in an axial direction of the piston member and wherein bore means are provided which intersect the overflow channel means and are in communication with the aperture means.

11. A vibration damper according to claim 10, wherein the bore means extend substantially at right angle to the overflow channel means and generally in a radial direction of the piston member.

12. A vibration damper comprising:
cylinder means,
piston means movably disposed in said cylinder means with a first fluid working space at one side of said piston means and a second fluid working space at the other side of said piston means,
first damping valve means for permitting passage of fluid medium from said first space to said second space in response to a predetermined increase of pressure in said first space upon movement of said piston means in a direction toward said first space,
second damping valve means for permitting passage of fluid medium from said second space to said first space in response to a predetermined increase of pressure in said first space upon movement of said piston means in a direction toward said second space, bypass connection means for accommodating passage of fluid medium between said first and second spaces in bypassing relationship to said first and second damping valve means, and bypass valve means for continuously and automatically controlling the flow cross-section of said bypass connection means in dependence on at least one influencing magnitude during operational use of said damper with said piston and cylinder moving relative to one another, wherein said bypass valve means includes a movable adjusting piston means which directly controls the cross-section of said bypass connection means, said adjusting piston means being a stepped piston having three stepped piston sections of different diameters and having respective first through fourth separate pressure surfaces, said first pressure surface being acted on by a pressure indicative of vehicle static load, said second and third pressure surfaces being acted on by pressures in said respective working spaces, said fourth pressure surface being acted on by atmospheric pressure, and wherein a bore extends axially in said adjusting piston means for communicating said atmospheric pressure with said fourth pressure surface.

* * * * *